(No Model.) 2 Sheets—Sheet 1.
E. W. SCOTT.
WHIP SOCKET.
No. 426,605. Patented Apr. 29, 1890.
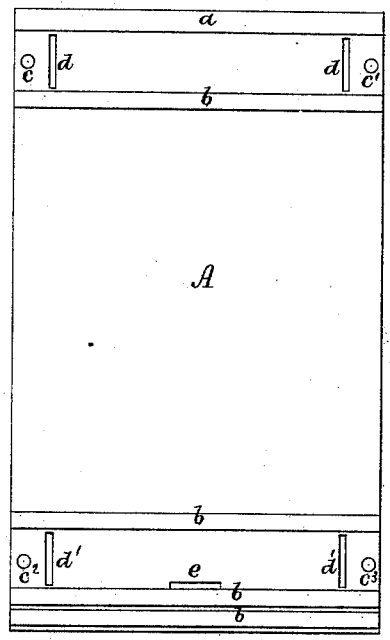
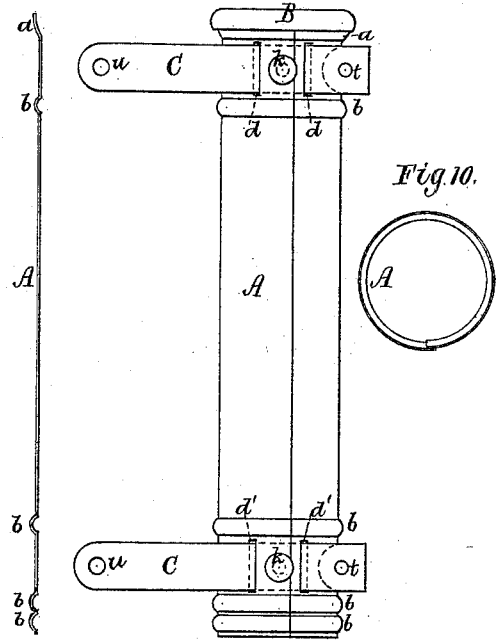
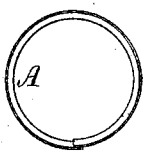
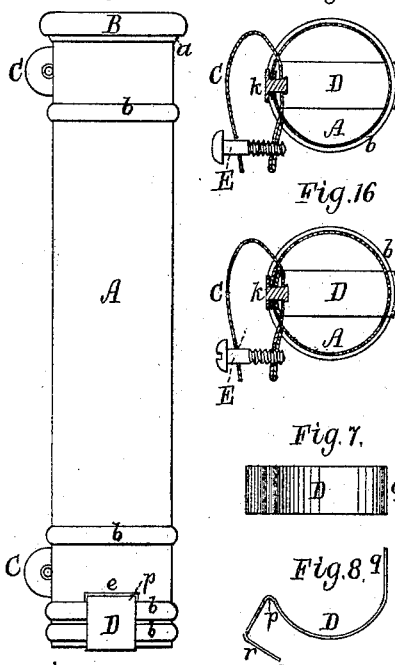
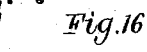
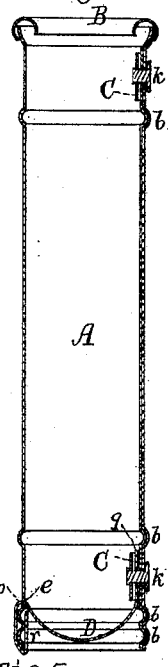
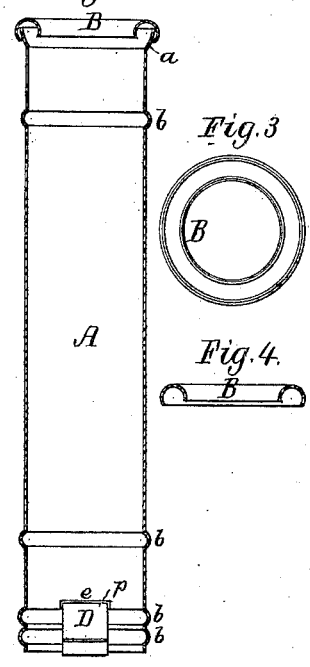
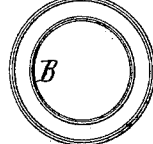
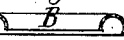
Witnesses
A. F. Piper
W. E. Piper
Inventor,
Erastus W. Scott
by S. N. Piper, atty.
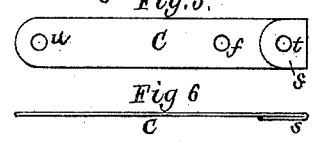

(No Model.) 2 Sheets—Sheet 2.

E. W. SCOTT.
WHIP SOCKET.

No. 426,605. Patented Apr. 29, 1890.

Witnesses.
A. F. Piper
W. E. Piper

Inventor.
Erastus W. Scott,
by S. N. Piper, atty.

UNITED STATES PATENT OFFICE.

ERASTUS W. SCOTT, OF DANIELSONVILLE, CONNECTICUT.

WHIP-SOCKET.

SPECIFICATION forming part of Letters Patent No. 426,605, dated April 29, 1890.

Application filed October 28, 1889. Serial No. 328,448. (No model.)

*To all whom it may concern:*

Be it known that I, ERASTUS W. SCOTT, a citizen of the United States, residing at Danielsonville, in the county of Windham and State of Connecticut, have invented certain new and useful Improvements in Whip-Sockets; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 17:
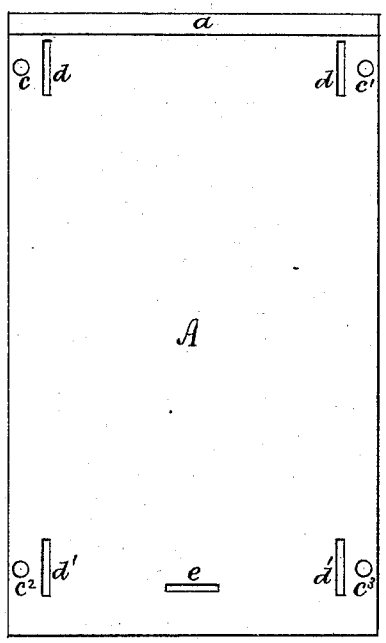
Figure 18:
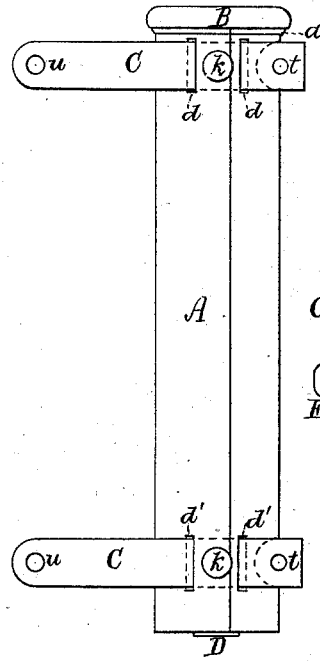
Figure 19:
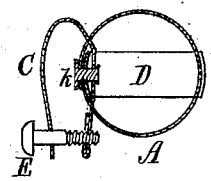
Figure 20:
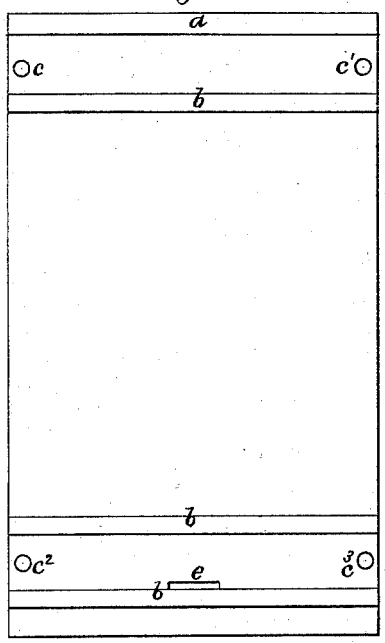
Figure 21:
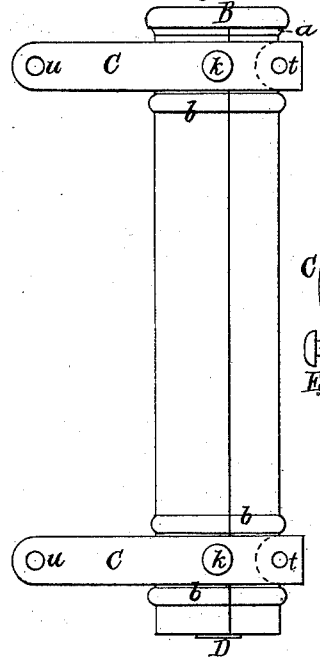
Figure 22:
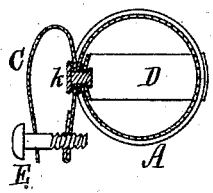

Figure 1 is a face view, and Fig. 2 an edge view, of a piece of sheet metal as stamped and punched to form the body of a whip-socket of my invention. Fig. 3 is a top view, and Fig. 4 a cross-section, of the cap as formed to apply to the body of the socket. Fig. 5 is a side view, and Fig. 6 an edge view, of a strip of sheet metal as shaped and punched to form the fastening-clamps of the socket. Fig. 7 is a top view, Fig. 8 an edge view, and Fig. 9 a side view, of a strip of sheet metal as shaped and punched to form the bottom of the socket. Fig. 10 is a top view of the body of the socket after being wound. Fig. 11 is a side view of the said body with the cap and strips applied to it. Fig. 12 is a view of the socket, showing the side opposite to that shown in Fig. 11. Figs. 13 and 14 are vertical sections of the socket taken in planes at right angles to each other. Fig. 15 is a horizontal section of the socket, taken through the upper fastening-clamp; and Fig. 16 is a horizontal section of the socket, taken through the lower fastening-clamp. Fig. 17 is a face view of a piece of sheet metal to form the body of a whip-socket, stamped and punched like that shown in Fig. 1, except that it is unprovided with the beads or projections $b$; and Fig. 18 is a side view, and Fig. 19 a horizontal section, of said body with the cap and strips applied to it. Fig. 20 is a face view of a piece of sheet metal to form the body of a whip-socket, stamped and punched like that shown in said Fig. 1, except that it is unprovided with the slots $d\ d\ d'\ d'$; and Fig. 21 is a side view, and Fig. 22 a horizontal section, of said body with the cap and the strips applied to it.

The nature of my invention is defined in the claims hereinafter presented.

In carrying out my invention I take for the body of the socket a piece of sheet metal A of the required dimensions and stamp it to form it with the projections $a$ and $b\ b\ b$, the holes $c\ c'\ c^2\ c^3$, and slots $d\ d,\ d'\ d'$, and $e$. (See Figs. 1 and 2.) Next said piece is wound to give to it the shape in end view as shown in Fig. 10, and cause its edges to lap past each other a little. Next said piece is compressed in the hand to reduce its circumference sufficiently to allow the flaring projection $a$ of said piece to enter within the hollow spun cap-ring B, and when said piece is released from the pressure of the hand it will expand outwardly against the interior of the said ring, as shown in Figs. 13 and 14, and hold said cap-ring firmly to the body, it being so arranged that the holes $c\ c'$ shall range with each other, and the holes $c^2\ c^3$ shall coincide when the said projection $a$ bears against the larger interior circumference of the said cap-ring B. Next two of the strips or bands C, formed and provided with holes, as shown in Figs. 5 and 6, are applied, one to the upper slots $d\ d$ and the other to the lower slots $d'\ d'$ of the body A, the hole $f$ in the upper strip coinciding with the holes $c\ c'$, and the said hole $f$ in the lower strip with the holes $c^2\ c^3$ in the said body. Next the end $o$ of the piece D is introduced into the slot $e$ of the body until its bend $p$ rests in the said slot. Then the end $q$ of said piece D is moved upward and entered between the strip C and the body till the hole $g$ in said piece ranges with the hole $f$ in the said strip and with the holes $c^2$ and $c^3$ in the body. Next rivets $k$ are inserted into said holes $c^2$, $c^3$, $g$, and $f$, and also into the holes $c, c'$, and $f$, and are upset, after which the part $r$ of the piece D is bent upward and inward against the interior of the socket, as shown in Fig. 13, said piece D constituting the bottom of the socket, or a rest for the whip, as shown. The socket is now in readiness to receive a coating of japan. It will be observed that the strips C are provided with a turned-over part $s$, the hole $t$ therein extending through both thicknesses of the strip. This is done to give a longer bearing for the thread of the clamping-screws E, the body of said screws working in a hole $u$ in the other end of said strips when bent into the required form for the fastening bands or clamps, as shown in Figs. 15 and 16.

From the foregoing it will be seen that the several parts of which the socket is composed are secured in position by means of the two rivets $k\ k$, no solder being used to unite any of the parts.

Sometimes I dispense with the projections $b\ b\ b$ on the body of the socket, and in some cases I make the said body without the slots $d\ d$ and $d'\ d'$, and apply the strips or bands C and rivet them to the outside of the socket, one between the projections $b\ b$ at the bottom of it and the other between the projections $b$ and $a$ at the top of it, said projections serving to prevent the strips when applied in this way from turning to any extent on the rivets $k$.

What I claim is—

1. The whip-socket composed of the body A, provided with the flaring top $a$, the projections $b$, and the holes and slots, as shown, the hollow cap-ring B, adapted to and held to the socket by the top $a$, the strips C C, and bottom piece D, each perforated, as shown, the said body, the strips, and the bottom piece being secured together by rivets $k\ k$, all essentially as shown and set forth, combined with the screws E, as represented.

2. The whip-socket composed of the body provided with the flaring top $a$, the holes $c\ c'\ c^2\ c^3$, the slots $d\ d$, $d'\ d'$, and $e$, as described, the hollow cap-ring B, adapted to the top $a$, as shown, the strips C C, and bottom piece D, each perforated, as shown, the said body, the strips, and the bottom piece being secured together by rivets $k\ k$, all substantially as shown and set forth, combined with the screws E, as represented.

3. The whip-socket composed of the body provided with the flaring top $a$, the projections $b\ b\ b$, the holes $c\ c'\ c^2\ c^3$, and the slot $e$, as described, the hollow cap-ring B, adapted to the top $a$, as shown, the strips C C, and the bottom piece D, each perforated, as shown, the said body, the strips, and the bottom piece being secured together by the rivets $k\ k$, all substantially as shown and set forth, combined with the screws E, as represented.

In testimony whereof I affix my signature in presence of two witnesses.

ERASTUS W. SCOTT.

Witnesses:
ARTHUR E. BILL,
ANNIE E. BUTTS.